US012266456B2

(12) United States Patent
Goll et al.

(10) Patent No.: US 12,266,456 B2
(45) Date of Patent: Apr. 1, 2025

(54) PROTECTION ADAPTER AND SYSTEM

(71) Applicant: Siemens Energy Global GmbH & Co. KG, Munich (DE)

(72) Inventors: Felix Goll, Nuremberg (DE); Christian Scheibe, Erlangen (DE); Oliver Cwikowski, Wigan (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 348 days.

(21) Appl. No.: 17/794,705

(22) PCT Filed: Jan. 22, 2020

(86) PCT No.: PCT/EP2020/051513
§ 371 (c)(1),
(2) Date: Jul. 22, 2022

(87) PCT Pub. No.: WO2021/148115
PCT Pub. Date: Jul. 29, 2021

(65) Prior Publication Data
US 2023/0058222 A1 Feb. 23, 2023

(51) Int. Cl.
*H01C 7/12* (2006.01)
*H01C 1/028* (2006.01)

(52) U.S. Cl.
CPC ............... *H01C 7/12* (2013.01); *H01C 1/028* (2013.01)

(58) Field of Classification Search
CPC .................................. H01C 7/12; H01C 1/028
See application file for complete search history.

(56) References Cited

U.S. PATENT DOCUMENTS 4,212,047 A * 7/1980 Napiorkowski .......... H01T 1/14 361/124
5,657,196 A * 8/1997 Chaudhry .............. H01R 24/48 361/111
(Continued)

FOREIGN PATENT DOCUMENTS

EP 1861908 B1 * 10/2017 ............. H02G 13/00

OTHER PUBLICATIONS

EP-1861908, machine translation. (Year: 2017).*
(Continued)

*Primary Examiner* — Kyung S Lee
(74) *Attorney, Agent, or Firm* — Laurence A. Greenberg; Werner H. Stemer; Ralph E. Locher

(57) ABSTRACT

A protection adapter for the overvoltage protection of an electrical operating device in a high-voltage line. The protection adapter has a first adapter interface for electrically conductively coupling to an open-air interface of the high-voltage line, a second adapter interface for electrically conductively coupling to an operating-means interface of an electrical operating device, a connecting line for electrically conductively coupling the first adapter interface and the second adapter interface, and an electrically insulating insulation sheath which surrounds at least the connecting line. The protection adapter has a characteristic impedance for reducing electrical surges from the high-voltage line. There is also described a system with a high-voltage line, an electrical operating device, and a protection adapter.

18 Claims, 2 Drawing Sheets

(56) References Cited

U.S. PATENT DOCUMENTS

| | | | | |
|---|---|---|---|---|
| 5,790,361 | A * | 8/1998 | Minich | H01R 24/48 361/111 |
| 7,937,825 | B2 * | 5/2011 | Shato | H01T 4/12 29/610.1 |
| 2019/0036414 | A1 | 1/2019 | Ludois et al. | |

OTHER PUBLICATIONS

Siemens: "Answers for energy. Line surge arresters for increased system reliability", XP055722768, URL: https://assets.new.siemens.com/siemens/assets/api/uuid:877ddlcdfe4cc8566bbf20c202e2369dd4f61c26/e50001-g630-a203-x-4a00-rz-lsa-ableiterschrift-eng.pdf; 2012.

H. Schmitt, W. Winter: "Simulation of Lightning Overvoltages in Electrical Power Systems", IPST, Rio de Janeiro, Jun. 2001; 2001.

Hinrichsen Volker: "Metal-Oxide Surge Arresters in High-Voltage Power Systems", XP055722721, URL: https://assets.new.siemens.com/siemens/assets/api/uuid:64a37729c7408dfle15b39ca8c9cde8b957a5463/e50001-g630-h197-x-4a00-ableiterhandbuch-teil-1-a4.pdf; 2012.

ABB Switzerland Ltd.: "Protective Distance Overvoltage Protection", XP055722963, URL: https://search.abb.com/library/Download.aspx?DocumentID=IHC0138872&LanguageCode=en&DocumentPartid=&Action=Launch; 2019.

Yang, Kun: "Study on Electrical Characteristics of Metal-Oxide Surge Arresters in Medium Voltage Power Systems", Advanced materials research, pp. 1073-1076, XP055722765, DOI: 10.4028/www.scientific.net/AMR.960-961.1073, URL: https://library.e.abb.com/public/dc42f0e0b30e48d08c54f683ef27b7b0/ABB%20Medium-voltage%20surge%20arresters%20-%20Application%20Guidelines%201HC0075561%20E2%20AC%20(read%20view).pdf; 2014.

* cited by examiner

PROTECTION ADAPTER AND SYSTEM

FIELD AND BACKGROUND OF THE INVENTION

The invention relates to a protection adapter for the overvoltage protection of electrical operating means in a high-voltage line, in particular in a high-voltage overhead line. The invention also relates to a system having a high-voltage line, an electrical operating means and a protection adapter.

High-voltage lines, in particular high-voltage overhead lines, represent a current standard for power transmission over long distances with the lowest possible losses. The high-voltage lines are arranged at a distance from the ground mostly by means of transmission towers for reasons including safety, installation space and cost efficiency. However, due to being arranged at appropriate heights, the high-voltage lines are exposed to an increased risk of lightning strikes and consequently require safeguarding against overvoltages and damage to the high-voltage lines, adjoining operating means and devices.

Overvoltage arresters are known to protect against damage from overvoltages in high-voltage lines. An overvoltage arrester within the context of the invention is to be understood for example as known grounding points of transmission towers and/or overvoltage arresters installed on anchor towers and/or as overvoltage arresters of an overhead line. Within the context of the invention, therefore, the overvoltage arresters are divided into tower overvoltage arresters and line overvoltage arresters. These overvoltage arresters are preferably installed upstream of an electrical operating means with changed electrical characteristics, in particular a changed surge impedance. However, a disadvantage that the conventional overvoltage arresters have in common is that, as the distance from a grounding point increases, the protection against damage from overvoltages, for example due to a lightning strike in high-voltage lines, decreases. The connection of high-voltage overhead lines to energy generators, energy consumers or electrical substations mostly make provision for connecting the high-voltage overhead lines to electrical operating means in the form of gas-insulated lines, gas-insulated bus ducts or else cables. High-voltage lines through high-voltage overhead lines and, in sections, electrical operating means such as gas-insulated lines or cables can also partly be underground. The electrical operating means could be designed to be more material-saving and cost-saving or improved protection against overvoltages in the high-voltage lines or improved protection against propagation or transmission of the overvoltages from the high-voltage lines to the electrical operating means.

SUMMARY OF THE INVENTION

It is therefore the object of the present invention to at least partly eliminate the disadvantages and restrictions described above for the overvoltage protection of electrical operating means in a high-voltage line. In particular, it is the object of the present invention to provide a protection adapter for the overvoltage protection of electrical operating means in a high-voltage line and a system composed of a high-voltage line, an electrical operating means and a protection adapter.

The above object is achieved by way of a protection adapter as claimed and by way of a system as claimed. Further features and details of the invention result from the dependent claims, the description and the drawings. In this case, features and details described in connection with the protection adapter according to the invention of course also apply in connection with the system according to the invention and vice versa in each case, such that, with respect to the disclosure, reference is always made or can always be made reciprocally to the individual aspects of the invention.

According to a first aspect of the invention, the object is achieved by way of a protection adapter for the overvoltage protection of electrical operating means in a high-voltage line, in particular in a high-voltage overhead line. The protection adapter comprises a first adapter interface for the electrically conductive coupling to an open-air interface of the high-voltage line, a second adapter interface for the electrically conductive coupling to an operating-means interface of an electrical operating means, a connecting line for the electrically conductive coupling of the first adapter interface and the second adapter interface, and an electrically insulating insulation sheath. The electrically insulating insulation sheath surrounds at least the connecting line. The protection adapter, in particular the connecting line, has a surge impedance for reducing electrical surges from the high-voltage line.

Within the context of the invention, an electrical operating means is to be understood as a line extension of the high-voltage line, in particular the high-voltage overhead line, for example close to the ground or underground. Gas-insulated lines, oil-insulated lines, solid-material-insulated lines or else gas-insulated bus ducts are usually used as electrical operating means. The electrical operating means constitute a high cost factor in the high-voltage infrastructure. Improved protection by way of the protection adapter from overvoltages in or from the high-voltage lines, in particular the high-voltage overhead lines, for example due to a lightning strike, makes it possible to save costs, installation space and material for the configuration of the electrical operating means. A protection adapter according to the invention makes such protection possible advantageously and in a manner sensitive to construction material and costs by way of the inventive features as claimed. The surge impedance of the protection adapter, in particular of the connecting line, makes it possible to reduce the electrical surges from the high-voltage line, preferably by way of reflection and refraction. A surge is partly reflected and partly refracted at the connecting point of two line sections with different surge impedances. The surge impedance of the protection adapter for reducing electrical traveling waves from the high-voltage line is thus to be understood in particular as a change in the surge impedance from the previous or subsequent line section, in particular the first adapter interface and/or the second adapter interface, the protection adapter and/or the high-voltage line. A point of impact for a traveling wave and/or surge is produced by way of a change, in particular an abrupt change, in the surge impedance, as a result of which the surge is reduced through refraction and reflection.

The insulation sheath according to the invention surrounds at least the connecting line. The insulation sheath can also advantageously surround the first and second adapter interface of the protection adapter. The first and second adapter interface of the protection apparatus can be designed as constructive adapter devices, adapter assemblies or as simply end faces of the connecting line. The first adapter interface, the second adapter interface and/or the connecting line can comprise a surge impedance transition from a high first surge impedance value, in particular the surge impedance value of the high-voltage overhead line or the electrical operating means, to a lower surge impedance value of the connecting line. The surge impedance of the connecting line is formed to be lower at least in regions than the surge impedance of the first adapter interface, the second adapter interface, the operating means and/or the high-voltage line. The surge impedance of the protection adapter can preferably be adapted by way of a line cross section of the first adapter interface, the second adapter interface and/or the connecting line. Within the context of the invention, the cross section of the electrically conductive line without its insulation can be understood as line cross section. It is thus possible, for example, given a constant covering, to produce a low surge impedance by way of a high line cross section and vice versa. The first adapter interface, the second adapter interface and/or the connecting line can consequently have a transition from a lower first line cross section with a first higher surge impedance to a larger second line cross section with a second lower surge impedance. The lower first line cross section is in this case preferably arranged at at least one front-side end of the protection adapter, in particular at the first and/or second adapter interface, in order to make it possible to advantageously connect to the high-voltage line and/or the electrical operating means. The larger second line cross section with the lower second surge impedance is advantageously arranged in a section of the protection adapter that is arranged centrally or substantially centrally in the protection adapter and/or that is spaced apart at least from a front-side end of the protection adapter, that is to say the first adapter interface and/or the second adapter interface. A protection adapter according to the invention is advantageously designed as a passive protection adapter and thus is cost-effective, requires no servicing and has a long life. By way of a protection adapter designed in this way, the dielectric strength of the insulation section of the electrical operating means can be reduced and thus the operating means can be designed to be more compact, more cost-effective and in a more material-saving manner.

According to a preferred development of the invention, in a protection adapter according to the invention, provision may be made for the surge impedance to have a surge impedance profile, wherein the surge impedance profile is of constant form or is of substantially constant form at least in areas, in particular wherein the surge impedance profile is of constant form or is of substantially constant form over a main extent of the connecting line. Within the context of the invention, a surge impedance profile is to be understood as the profile of the values of the surge impedance of the protection adapter over the extent of the protection adapter. As is typically known for lines and cables, the protection adapter has a main extent and a cross section. The surge impedance can be of a different form over the main extent of the protection adapter. According to the above development of the protection adapter, the surge impedance is of constant form at least in areas. The surge impedance that is constant at least in areas can be achieved in an increasing or decreasing manner, in particular abruptly, and differs from the surge impedance of the adjoining line sections. As described above, an abrupt change in the surge impedance is advantageous for the reflection and refraction of the surge since a point of impact for a surge is produced.

According to a preferred development of the invention, in a protection adapter according to the invention, provision may be made for the surge impedance to have a surge impedance profile, wherein the surge impedance profile is of increasing or decreasing form at least in areas. As an alternative or in addition to the preceding passage, the protection adapter can have at least in regions a surge impedance profile that is of increasing or decreasing form. In particular in the region of the first adapter interface and/or the second adapter interface, the surge impedance profile can advantageously be of increasing or decreasing form for the electrically conductive connection to the high-voltage line and/or the operating means. The first adapter interface and/or the second adapter interface can thus enable a transition from a high surge impedance that corresponds or substantially corresponds for example to the surge impedance of the adjoining line sections, that is to say for example to the high-voltage line and/or the operating means, to a lower surge impedance of the connecting line. For example, this can be made possible by a change in the cross section or an increase in the cross section of the first adapter interface and/or the second adapter interface with respect to the cross section of the connecting line. The protection adapter according to the invention can of course also have other surge impedance profiles that correspond to the surge impedance profile described above or that differ therefrom. The surge impedance profiles can repeat in the protection adapter and/or be formed in a manner mirrored at the plane of the protection adapter.

According to a preferred development of the invention, in a protection adapter according to the invention, provision may be made for the surge impedance profile to be of decreasing form from the first adapter interface or the second adapter interface to the connecting line. It is advantageous if the surge impedance of the connecting line of the protection adapter is lower than the surge impedance of the adjoining line sections, that is to say for example the operating means and the high-voltage line. As described above, a surge impedance profile that enables a transition from the different surge impedances can be formed for this purpose at the first adapter interface and/or at the second adapter interface. In addition or as an alternative, the transition can be formed in areas or entirely in the connecting line of the protection adapter. The transition of the surge impedances may be of stepped, uniform, exponential or irregular form. While an abrupt increase in the line cross section or an abrupt decrease in the surge impedance is advantageous for the reflection and refraction of a surge, a uniform transition between the surge impedances and/or the line cross sections between two line sections is advantageous for the constructive electrically conductive connection of the two line sections.

According to a preferred development of the invention, in a protection adapter according to the invention, provision may be made for the surge impedance profile to be of increasing or decreasing form over the main extent of the connecting line. In addition or as an alternative to the above statements, the profile of the surge impedance of the protection adapter can extend in regions, completely or substantially completely over the main extent of the connecting line of the protection adapter.

According to a preferred development of the invention, in a protection adapter according to the invention, provision may be made for the insulation sheath to comprise at least in regions a first insulation medium, in particular a gas and/or a liquid, and/or at least in areas a second insulation medium, in particular a solid material. The insulation sheath of the protection adapter according to the invention is preferably formed with a gas insulation, an oil insulation, a solid-material insulation and/or with a combination of the aforementioned insulation options. The insulation sheath can correspond to the insulation of the adjoining line sections or differ therefrom. Using the insulation sheath of the protection adapter, there may be a transition from a first insulation to a second insulation from the above insulation options for example even over the main extent of the protection adapter. A gas insulation preferably has at least in areas a first insulation medium, in this case a gas, and at least in areas a second insulation medium, in this case a solid material in the form of a cylindrical covering.

According to a preferred development of the invention, in a protection adapter according to the invention, provision may be made for the insulation sheath to have at least one insulation-medium interface, wherein the at least one insulation-medium interface is designed for coupling, in particular for insulation-medium-permeable or insulation-medium-impermeable coupling, to a mating interface of an insulation section of the high-voltage line and/or to a mating interface of an insulation section of the electrical operating means. An insulation-medium interface according to the invention makes it possible for example to exchange an insulation medium using a mating interface of an adjoining line section. As an alternative, the insulation sheath of the protection adapter can of course also be formed as a separate and/or closed system.

According to a preferred development of the invention, in a protection adapter according to the invention, provision may be made for the connecting line of the protection adapter to have at least a length of 5 m, preferably at least a length of 50 m, particularly preferably at least a length of 100 m. Within the context of the invention, the length of the protection adapter is to be understood as the length of the protection adapter along the previously described main extent of the protection adapter. The length of the protection adapter can be adapted to the protection demands of the electrical operating means. A greater length of the protection adapter advantageously enables a longer section for refracting the surges.

According to a preferred development of the invention, in a protection adapter according to the invention, provision may be made for the protection adapter to have a line cross section, wherein the line cross section is of constant form or is of substantially constant form, in particular wherein the line cross section is of constant form or is of substantially constant form over a main extent of the connecting line. The surge impedance of the protection adapter can be adapted over the line cross section. It is thus possible, in particular given a constant dimensioning of the encapsulation housing, to produce for example a low surge impedance by way of a high line cross section. The first adapter interface, the second adapter interface and/or the connecting line can have a transition from a lower first line cross section with a first higher surge impedance to a greater second line cross section with a second lower surge impedance. The lower first line cross section is in this case preferably arranged at at least one front-side end of the protection adapter, in particular at the first and/or second adapter interface, in order to make advantageous connection to the high-voltage line and/or the electrical operating means possible. The larger second line cross section with the lower second surge impedance is advantageously arranged in a section of the protection adapter that is spaced apart at least from a front-side end of the protection adapter, that is to say the first adapter interface and/or the second adapter interface. Within the context of the invention, it is also possible to form the cross section of the insulating encapsulation of the protection adapter in relation to the line cross section or irrespective of the line cross section to be constant or substantially constant over the main extent of the connecting line and/or to form the cross section of the insulating encapsulation to be increasing or decreasing. The cross section of the insulating encapsulation can thus be formed for example to be increasing or decreasing and the line cross section to be constant and/or increasing or decreasing.

According to a preferred development of the invention, in a protection adapter according to the invention, provision may be made for the protection adapter to have a line cross section, wherein the line cross section is of increasing form from the first adapter interface or the second adapter interface to the connecting line and/or wherein the line cross section is of increasing or decreasing form over the main extent of the connecting line. As an alternative or in addition to the above passage, the protection adapter can comprise at least in regions a line cross section that is of increasing or decreasing form. In particular in the region of the first adapter interface and/or the second adapter interface, the line cross section can advantageously be of increasing or decreasing form for the electrically conductive connection to the high-voltage line and/or the operating means. The first adapter interface and/or the second adapter interface can thus enable a transition from a low line cross section that corresponds or substantially corresponds for example to the line cross section of the adjoining line section is, that is to say for example to the high-voltage line and/or the operating means, to a high line cross section of the connecting line of the protection adapter. The protection adapter according to the invention can of course also have other line cross sections or changes in the line cross section.

According to a second aspect of the invention, the object is achieved by way of a system having a high-voltage line with an open-air interface, an electrical operating means with an operating-means interface, and a protection adapter. The protection adapter is formed according to the first aspect of the invention. In particular, the protection adapter is arranged between the operating-means interface and the open-air interface. All of the advantages that have been described with respect to a protection adapter according to the first aspect therefore of course also result for a system according to the invention. Improved protection of the operating means by way of the protection adapter from overvoltages in or from the high-voltage line, for example due to a lightning strike, makes it possible to save costs, installation space and material for the configuration of the electrical operating means. A system according to the invention makes such protection possible advantageously and in a manner sensitive to construction material and costs by way of the protection adapter according to the invention having the features according to the first aspect. The protection adapter is advantageously arranged between the operating means and the high-voltage line or the open-air section of the high-voltage line for the protective action. The surge impedance of the protection adapter or the difference in the surge impedance from the adjacent line sections or the, in particular abrupt, decrease in the surge impedance of the protection adapter, in particular the connecting line, makes it possible, preferably through reflection and refraction, to reduce the electrical surges from the high-voltage line and thus to protect the operating means.

According to a preferred development of the invention, in a system according to the invention, provision may be made for the greatest surge impedance of the protection adapter, in particular at a constant surge impedance of the protection adapter, to be formed to be lower than the smallest surge impedance of the operating-means interface and/or of the electrical operating means. It is advantageous if the protection adapter has a lower surge impedance compared to the operating means and the open-air section of the high-voltage line. The protection adapter advantageously has a surge impedance that is 30 to 80% of the value of the surge impedance of the electrical operating means. Also advantageously, the protection adapter has a surge impedance that is 5 to 25% of the value of the surge impedance of the high voltage line. As exemplary characteristic values, an open-air section of a high-voltage line has a surge impedance of 250 to 300 ohms. An electrical operating means, for example in the form of a gas-insulated conductor, in practice has a surge impedance of 30 to 70 ohms depending on the design. According to the forms of the system, the greatest surge impedance of the protection adapter can be selected for most configurations to be lower than the lowest surge impedance of the electrical operating means. In the above example, the surge impedance of the protection adapter is consequently less than 30 ohms. A point of impact for a surge is produced by way of a change, in particular an abrupt change, in the surge impedance, as a result of which the surge is reduced through refraction and reflection and the electrical operating means is protected from damage due to a surge, in particular from the high-voltage line.

According to a preferred development of the invention, in a system according to the invention, provision may be made for the system also to comprise at least one tower overvoltage arrester, at least one line overvoltage arrester and/or at least one transmission tower, in particular wherein each one of the at least one tower overvoltage arresters is preferably arranged in the region of one of the at least one transmission towers, in particular wherein the protection adapter is arranged in an electrically conductive manner between the at least one tower overvoltage arrester and/or the at least one line overvoltage arrester and the operating-means interface of the electrical operating means. The system according to the invention is particularly advantageous due to the combination of the protection adapter with at least one known overvoltage arrester. Conventional overvoltage arresters are cost-effective and can be produced and installed with little material and work outlay. Within the context of the invention, an overvoltage arrester is to be understood for example as known grounding points of transmission towers and/or overvoltage arresters installed on anchor towers. Within the context of the invention, the overvoltage arresters are therefore divided into tower overvoltage arresters and line overvoltage arresters. Transmission towers can of course also comprise more than one tower overvoltage arrester, for example for more than one grounding cable above the high-voltage lines. A system according to the invention formed in this way is particularly advantageous because it combines the advantages of known overvoltage arresters with the advantages of the system or the protection adapter and produces therefrom synergetic effects for the protection of the electrical operating means from surges from the high-voltage line.

According to a preferred development of the invention, in a system according to the invention, provision may be made for the electrical operating means to have a line cross section, wherein the line cross section of the electrical operating means is formed to be smaller than the line cross section of the protection adapter. The surge impedance of the protection adapter can preferably be adjusted by means of the line cross section. For example, a low surge impedance can thus be produced by way of a high line cross section. The first adapter interface, the second adapter interface and/or the connecting line can have a transition from a lower first line cross section with a first higher surge impedance to a larger second line across section with a second lower surge impedance. The lower first line cross section is in this case preferably arranged at at least one front-side end of the protection adapter, in particular at the first and or second adapter interface, in order to make it possible to advantageously connect to the high-voltage line and/or the electrical operating means. The larger second line cross section with the lower second surge impedance is advantageously arranged in a section of the protection adapter that is spaced apart at least from a front-side end of the protection adapter, that is to say the first adapter interface and/or the second adapter interface. The protection adapter advantageously has a line cross section that is 1.1 to 1.5 times the line cross section of the electrical operating means. The protection adapter likewise preferably has a line cross section that is 4 to 10 times the line cross section of the high-voltage line.

According to a preferred development of the invention, in a system according to the invention, provision may be made for the insulation sheath of the protection adapter to comprise the at least one insulation-medium interface and the insulation section of the high-voltage line and/or of the electrical operating means comprise the mating interface, in particular wherein the at least one insulation-medium interface is designed for insulation-medium-permeable coupling or insulation-medium-impermeable coupling to at least one of the mating interfaces. An insulation-medium interface according to the invention makes it possible for example to exchange an insulation medium using a mating interface of an adjoining line section. As an alternative, the insulation sheath of the protection adapter, of the electrical operating means and of the high-voltage line can of course also each be formed as a separate and/or closed system.

BRIEF DESCRIPTION OF THE FIGURES

A protection adapter according to the invention for the overvoltage protection of electrical operating means in a high-voltage line, a system according to the invention, the developments thereof and the advantages thereof are explained in more detail below with reference to drawings, in which in each case.

DETAILED DESCRIPTION OF THE INVENTION

Figure 1:
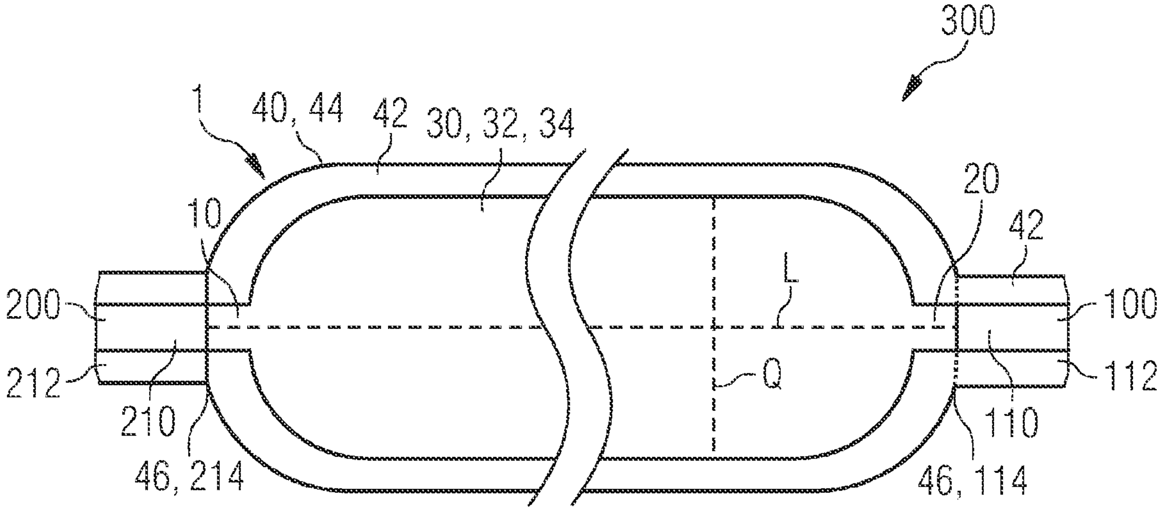
FIG. 1 schematically shows a protection adapter for the overvoltage protection of an electrical operating means in a high-voltage line with a substantially constant line cross section over the length of the main extent of the connecting line, FIG. 2 schematically shows a protection adapter the overvoltage protection of an electrical operating means in a high-voltage line with a substantially decreasing line cross section over the length of the main extent of the connecting line, and FIG. 3 schematically shows a system having two high-voltage lines each with an open-air interface, two electrical operating means each with an operating-means interface and each with a protection adapter.
Figure 2:
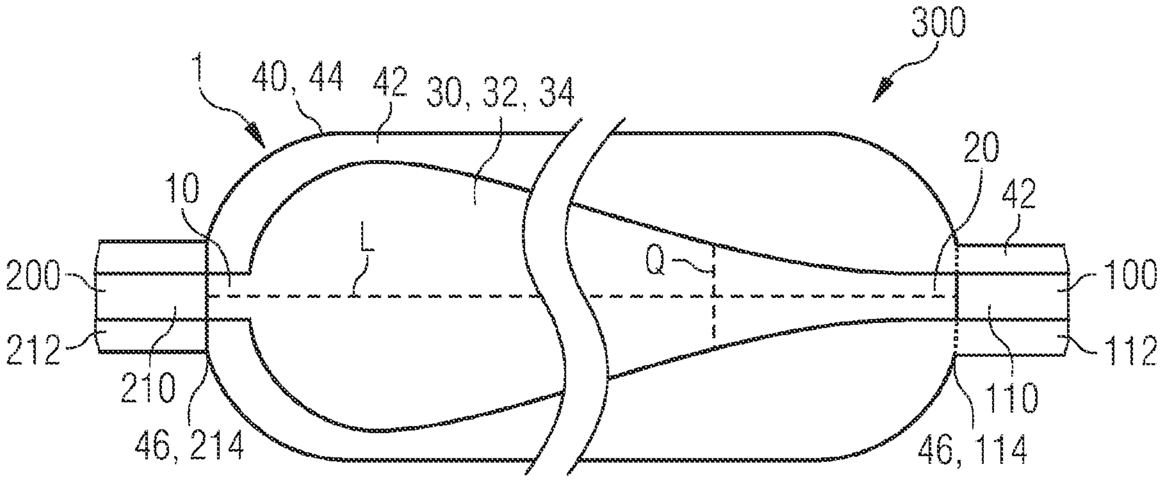
Figure 3:
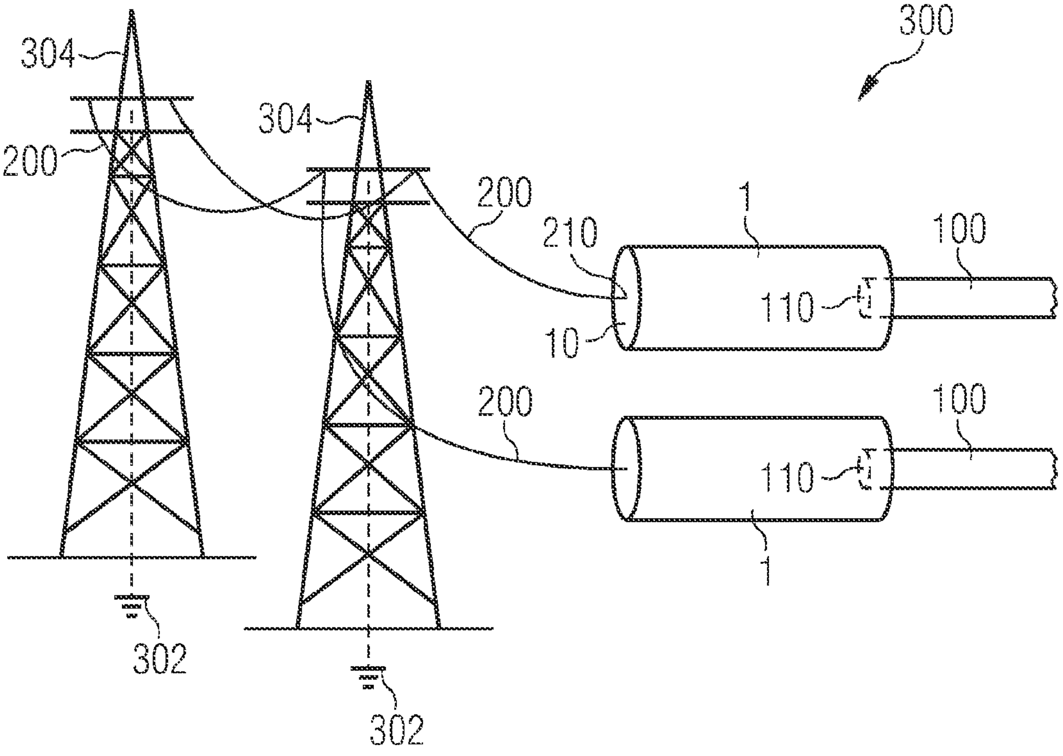

Elements with the same function and mode of operation are each provided with the same reference signs in FIGS. 1 to 3.

FIG. 1 shows a protection adapter 1 for the overvoltage protection of an electrical operating means 100 in a high-voltage line 200. The protection adapter 1 comprises a first adapter interface 10 and a second adapter interface 20. The first adapter interface 10 is electrically conductively connected to the open-air interface 210 of the high-voltage line 200. The second adapter interface 20 is electrically conductively connected to the operating-means interface 110 of the electrical operating means 100. The protection adapter 1 also comprises a connecting line 30 that electrically conductively connects the first adapter interface 10 to the second adapter interface 20. The adapter interfaces 10, 20 and the connecting line 30 have at least one line cross section Q, in this case a plurality of line cross sections Q. The line cross section Q is of substantially constant form over the length L of the main extent of the connecting line 30. In the end-side regions of the connecting line 30 or in regions of the first adapter interface 10 and the second adapter interface 20, the line cross section Q is of decreasing form in each case in order to approximate or match the cross section of the high-voltage line 200 or the electrical operating means 100. The protection adapter 1 also comprises in each case an insulation-medium interface 46, wherein the two insulation-medium interfaces 46 are designed or coupling to a mating interface 214 of an insulation section 212 of the high-voltage line 200 and to a mating interface 114 of an insulation section 112 of the electrical operating means 100. By way of example, the insulation section 212 of the high-voltage line 200 is designed as a solid-material insulation and the insulation section 112 of the electrical operating means 100 and the insulation sheath 40 of the protection adapter 1 is formed as a gas-insulated section. The insulation-medium interface 46 according to the invention and the mating interface 114 of the electrical operating means 100 can be formed in the aforementioned exemplary embodiment for an exchange of an insulation medium 42 for the insulation-medium-permeable coupling. As an alternative, the insulation sheath 40 of the protection adapter 1 can of course also be formed as a separate and/or closed system. The insulation sheath 40 of the protection adapter 1 according to the invention is formed by way of example as a gas insulation and comprises at least in areas a first insulation medium 42, in this case a gas, and at least in areas a second insulation medium 44, in this case a solid material in the form of a cylindrical covering. By way of a protection adapter 1 formed in this way, the surge impedance 32 of the connecting line 30 is at least in regions formed to be lower than the surge impedance 32 of the first adapter interface 10, the second adapter interface 20, the operating means 100 and/or the high-voltage line 200. The surge impedance 32 of the protection adapter 1 is preferably adjusted by the line cross section Q of the first adapter interface 10, the second adapter interface 20 and/or the connecting line 30. A low impedance resistance 32 can thus be produced by a high line cross section Q. The first adapter interface 10, the second adapter interface 20 and/or the connecting line 30 consequently enable a surge impedance profile 34 from a lower first line cross section Q with a first higher surge impedance 32 to a larger second line across section Q with a second lower surge impedance 32. The lower first line cross section Q is in this case preferably arranged at at least one front-side end of the protection adapter 1, in this case at the first and the second adapter interface 10, 20, in order to enable an advantageous connection to the high-voltage line 200 and the electrical operating means 100. A point of impact for a traveling wave and/or surge is produced by way of the change, in particular the abrupt change, in the surge impedance 32, as a result of which the surge is reduced through refraction and reflection. Improved protection of the operating means 100 by way of the protection adapter 1 from surges in of from the high-voltage line 200, for example due to a lightning strike, makes it possible to save costs, installation space and material for the design of the electrical operating means 100. A protection adapter 1 according to the invention makes such protection possible advantageously and in a manner sensitive to construction material and costs by way of the inventive features according to the first aspect of the invention.

FIG. 2 shows another configuration of a protection adapter 1 for the overvoltage protection of an electrical operating means 100 in a high-voltage line 200. Beyond the descriptions relating to the protection adapter 1 according to FIG. 1, the protection adapter 1 comprises a connecting line 30 with a line cross section Q, wherein the line cross section Q over the length L of the main extent of the connecting line 30 is of substantially decreasing form from the first adapter interface 10 to the second adapter interface 20. In addition to the variants shown in FIGS. 1 and 2, other combinations of the constant or substantially constant, the increasing and/or decreasing form of the line cross section of the protection adapter and/or the cross section of the insulating encapsulation of the protection adapter are of course also possible.

FIG. 3 shows a system 300 having to high-voltage overhead lines 200 each with an open-air interface 210, two phases of an electrical operating means 100 each with an operating-means interface 110 and each with a protection adapter 1. The protection adapter 1 is formed according to the first aspect of the invention. The high-voltage overhead lines 200 are arranged by means of transmission towers 304. The transmission towers 304 and for each have by way of example one tower overvoltage arrester 302. Line overvoltage arresters 303 are installed in the region of the last transmission tower 304, which is designed as an anchor tower. In FIG. 3, the protection adapters 1 are each arranged between the operating-means interface 110 and the open-air interface 210. All of the advantages that have been described with respect to a protection adapter 1 according to the first aspect of the invention therefore of course also results for a system 300 according to the invention.

LIST OF REFERENCE SIGNS

1 Protection adapter
10 First adapter interface
20 Second adapter interface
30 Connecting line
32 Surge impedance
34 Surge impedance profile
40 Insulation sheath
42 First insulation medium
44 Second insulation medium
46 Insulation-medium interface
100 Electrical operating means
110 Operating-means interface
112 Insulation section
114 Mating interface
200 High-voltage overhead line
210 Open-air interface
212 Insulation section
214 Mating interface
300 System
302 Tower overvoltage arrester
303 Line overvoltage arrester
304 Transmission tower
L Length
Q Line cross section

The invention claimed is:

1. A protection adapter for an overvoltage protection of an electrical operating device in a high-voltage line, the protection adapter comprising:

a first adapter interface for electrically conductively coupling the protection adapter to an open-air interface of the high-voltage line;

a second adapter interface for electrically conductively coupling the protection adapter to an operating-device interface of the electrical operating device;

a connecting line for electrically conductively coupling said first adapter interface and said second adapter interface; and an electrically insulating insulation sheath surrounding at least said connecting line; and the protection adapter having a surge impedance configured for reducing electrical surges from the high-voltage line, said surge impedance having a surge impedance profile with an increasing form or a decreasing form at least in areas thereof.

2. The protection adapter according to claim 1, wherein said surge impedance has a surge impedance profile and the surge impedance profile has a constant form or a substantially constant form at least in areas thereof.

3. The protection adapter according to claim 2, wherein said surge impedance profile has a constant form or a substantially constant form over a main extent of said connecting line.

4. The protection adapter according to claim 1, wherein the surge impedance profile has decreasing profile form from said first adapter interface to said connecting line or from said second adapter interface to said connecting line.

5. The protection adapter according to claim 4, wherein the surge impedance profile has an increasing or decreasing form over a main extent of said connecting line.

6. The protection adapter according to claim 1, wherein said insulation sheath comprises a first insulation medium, at least in portions thereof, and a second insulation medium, at least in portions thereof.

7. A protection adapter for an overvoltage protection of an electrical operating device in a high-voltage line, the protection adapter comprising:

a first adapter interface for electrically conductively coupling the protection adapter to an open-air interface of the high-voltage line;

a second adapter interface for electrically conductively coupling the protection adapter to an operating-device interface of the electrical operating device;

a connecting line for electrically conductively coupling said first adapter interface and said second adapter interface; and an electrically insulating insulation sheath surrounding at least said connecting line;

said insulation sheath comprising a first insulation medium, at least in portions thereof, and a second insulation medium, at least in portions thereof, said first insulation medium being selected from the group consisting of a gas and a liquid, and said second insulation medium being a solid material; and the protection adapter having a surge impedance configured for reducing electrical surges from the high-voltage line.

8. The protection adapter according to claim 6, wherein said insulation sheath has at least one insulation-medium interface configured for coupling to a mating interface of an insulation section of the high-voltage line and/or to a mating interface of an insulation section of said electrical operating device.

9. The protection adapter according to claim 8, wherein said at least one insulation-medium interface is configured for insulation-medium-permeable or insulation-medium-impermeable coupling.

10. The protection adapter according to claim 1, wherein said connecting line of said protection adapter has a length of at least 5 meters.

11. The protection adapter according to claim 10, wherein said connecting line of said protection adapter has a length of at least 100 meters.

12. The protection adapter according to claim 1, wherein the protection adapter has a line cross section with a constant form or substantially constant form.

13. A protection adapter for an overvoltage protection of an electrical operating device in a high-voltage line, the protection adapter comprising:

a first adapter interface for electrically conductively coupling the protection adapter to an open-air interface of the high-voltage line;

a second adapter interface for electrically conductively coupling the protection adapter to an operating-device interface of the electrical operating device;

a connecting line for electrically conductively coupling said first adapter interface and said second adapter interface; and an electrically insulating insulation sheath surrounding at least said connecting line; and the protection adapter having a surge impedance configured for reducing electrical surges from the high-voltage line; and wherein the protection adapter has a line cross section with an increasing form from said first adapter interface or said second adapter interface to said connecting line and/or wherein said line cross section has an increasing or decreasing form over a main extent of said connecting line.

14. An electrical system, comprising:

a high-voltage line with an open-air interface;

an electrical operating device with an operating-device interface;

a protection adapter according to claim 1 connected between said operating-device interface and said open-air interface; and at least one device selected from the group consisting of a tower overvoltage arrester, a line overvoltage arrester, and a transmission tower, wherein said protection adapter is electrically conductively connected between said tower overvoltage arrester and/or between said at least one line overvoltage arrester and said operating-device interface of said electrical operating device.

15. The system according to claim 14, wherein a greatest surge impedance of said protection adapter is formed to be lower than a smallest surge impedance of said operating-device interface and/or of a smallest surge impedance of said electrical operating device.

16. The system according to claim 14, wherein said tower overvoltage arrester is arranged in a region of said transmission tower.

17. The system according to claim 14, wherein said electrical operating device has a line cross section smaller than a line cross section of said protection adapter.

18. The system according to claim 14, wherein the insulation sheath of said protection adapter comprises at least one insulation-medium interface and an insulation section of said high-voltage line and/or of said electrical operating device is formed with a mating interface.

* * * * *